United States Patent [19]

Byard

[11] Patent Number: 5,063,831
[45] Date of Patent: Nov. 12, 1991

[54] PISTON PIN BEARING

[75] Inventor: Clifford D. Byard, Westport, Ind.

[73] Assignee: ML-KS Bearings, Inc., Greensburg, Ind.

[21] Appl. No.: 481,174

[22] Filed: Feb. 20, 1990

[51] Int. Cl.$^5$ .............................. F16J 1/16; F16J 1/08
[52] U.S. Cl. ...................................... 92/187; 92/190; 403/150
[58] Field of Search ................. 92/158, 187, 190, 216, 92/238; 403/150, 151, 152, 154, 158

[56] References Cited

U.S. PATENT DOCUMENTS

| | | | |
|---|---|---|---|
| 2,027,035 | 1/1936 | Gehres | 403/152 |
| 2,815,993 | 12/1957 | Schweitzer | 403/154 X |
| 3,053,595 | 9/1962 | Dilworth | 92/187 X |
| 3,476,021 | 11/1969 | Williams | 92/187 X |
| 3,789,743 | 2/1974 | Sihon | 92/238 X |
| 4,644,853 | 2/1987 | Russell et al. | 92/190 |

FOREIGN PATENT DOCUMENTS 1005318 3/1957 Fed. Rep. of Germany ...... 403/152

Primary Examiner—Edward K. Look
Assistant Examiner—George Kapsalas
Attorney, Agent, or Firm—David A. Greenlee

[57] ABSTRACT

A crosshead piston bearing assembly is disclosed. The piston bearing comprises a part-cylindrical upper bearing segment, or slipper, and a pair of spaced part-cylindrical lower bearing segments, or ears, engageable with the upper segment to form a pair of spaced continuous circular bearing surfaces and having an anti-rotation projection on either the slipper or the piston bore. The slipper has an arcuate extent of less than 180° to facilitate replacement of the slipper. The ears have a complementary arcuate extent. The slipper includes axially-spaced notches formed in the ends of the slipper to engage the ears to prevent the ears from moving inwardly into contact with the connecting rod.

16 Claims, 2 Drawing Sheets

PISTON PIN BEARING

BACKGROUND OF THE INVENTION

This invention relates generally to internal combustion engine pistons and, more particularly, to a connecting rod pin bearing for the piston in a four-stroke diesel engine.

Conventional bearing assemblies for crosshead pistons in four-stroke diesel engines are press-fitted into place and must be machined out for replacement when worn. This is a costly and time-consuming procedure which requires complete disassembly.

In recognition of the desirability of simplifying bearing installation, removal and replacement, several attempts have been made to develop an easily-replaced bearing assembly. These attempts have been based on two-stroke diesel connecting rod pin bearing technology. In two-stroke pistons, an insert bearing slipper is inserted within a recess formed in the wall of the piston head side of the pin bore. In a two-stroke application, opposed bearings are not needed, since reverse (upward) loading of the piston (and, thus loading of the bottom of the pin bore) is of negligible magnitude and seldom encountered.

Four-stroke engines pose a different situation in which substantial loads may be imposed between the underside of the pin and the bottom wall of the pin bore. Thus, bearings are needed on both the top and bottom of the pin. To maximize the effectiveness of these bearings, it has been found desirable to maintain close tolerances to minimize shock loading incurred by reciprocation.

U.S. Pat. No. 4,644,853 issued to Russell et al (Feb. 24, 1987), discloses a three-piece insertable bearing assembly for use in a crosshead piston. Based on two-stroke bearing technology, this patent provides an upper slipper bearing segment of less than semicylindrical arcuate extent which is slid axially into a broached recess in the upper portion of the pin bore. The slipper terminates in coplanar surfaces that engage the upper shoulders of lands formed in the sides of the pin bore. These lands serve to locate the slipper and prevent rotation of it during operation.

A pair of short lower bearing segments, or ears, are provided for axial insertion into similar less-than-semicylindrical recesses broached in the spaced portions of the piston skirt flanking the connecting rod operating area. These ear bearings also terminate in coplanar surfaces that engage the lower shoulders of the bore lands to prevent rotation during operation. Retaining rings are utilized on the axially inward sides of the bearing ears to prevent axially-inward movement of the ears into contact with the connecting rod during operation.

The bearing assembly disclosed in the Russell patent, following the two-stroke technology, has a true circular pin opening defined by the inner surfaces of the bearing slipper and ears and the pin bore lands, with close tolerances maintaining minimum clearance between pin and bearing. The three bearing segments are inserted axially into recesses broached into the pin bore. The lower ear segments are inserted into engagement with retaining rings. The lands have coplanar shoulders which are engaged by mating end surfaces of the bearing slipper and ears to prevent rotation of the bearing parts during operation. Axially-inward movement of the ears into contact with the connecting rod is prevented by retaining rings.

It has since been determined that bearing performance can be improved by providing a pin receiving bore that is not truly circular. Load-receiving arcuate portions of the slipper and ears are formed on arcs that have vertically spaced centers, creating a vertically elongated pin bore similar to an elliptical bore. In this arrangement, close tolerances are held at the sides of the pin/bearing interface, while the vertical separation of the arcuate load-bearing surfaces creates sufficient clearance for maintenance of an adequate oil film.

It is desirable to utilize this new technology in developing a commercially-feasible bearing design. It is therefore an object of this invention to provide a bearing assembly for a connecting rod pin in a piston that enables quick, economical installation, removal and replacement.

SUMMARY OF THE INVENTION

This invention provides a bearing for mounting to a wall of a piston bore in a piston assembly comprising a part-cylindrical upper bearing segment and a pair of spaced part-cylindrical lower bearing segments engageable with the upper segment to form a pair of spaced continuous circular bearing surfaces, characterized by the upper segment having an arcuate extent of less than 180°.

This invention further provides such a bearing in which axially-spaced notches are formed in the ends of the upper segment for receiving a portion of the lower segments to limit movement of the lower segments inwardly toward each other to prevent contact with the connecting rod. In addition, the upper segment and the bore wall have anti-rotation surfaces interengageable to prevent rotation of the upper and lower segments within the bore.

A better understanding of this invention can be obtained by reference to the following detailed description of the attached drawings, in which:

DETAILED DESCRIPTION OF THE INVENTION

Figure 1:
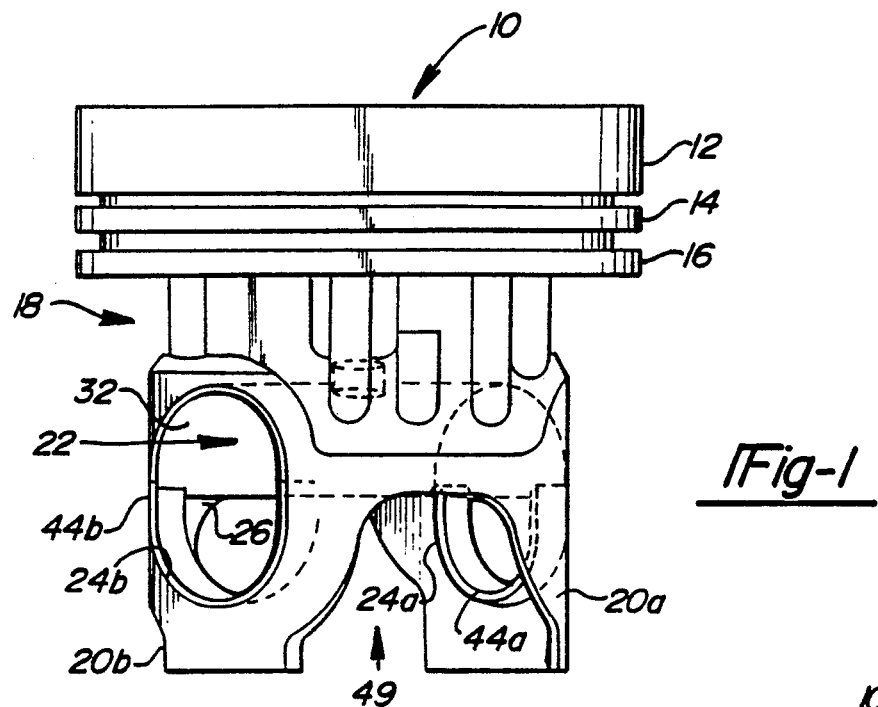
FIG. 1 is a perspective view of a crosshead piston incorporating a bearing according to this invention.
Figure 2:
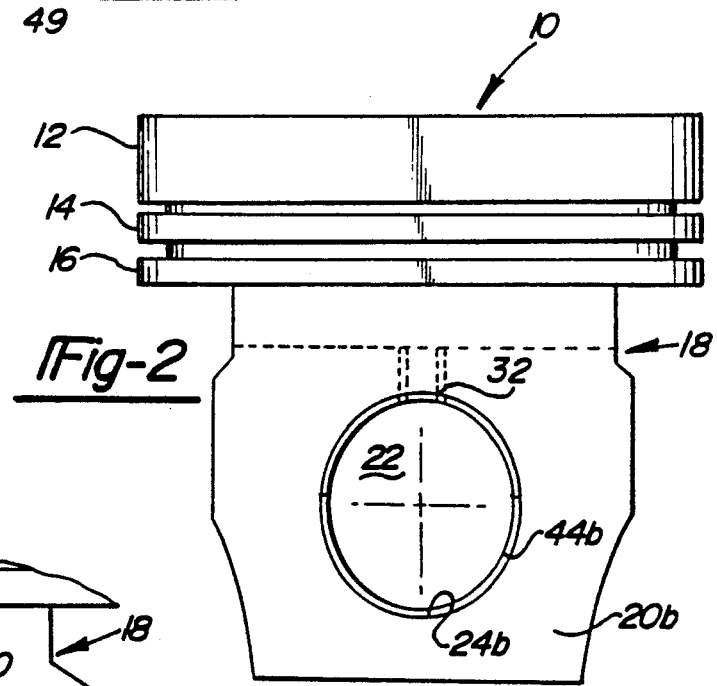
FIG. 2 is an end view of the piston of FIG. 1.
Figure 3:
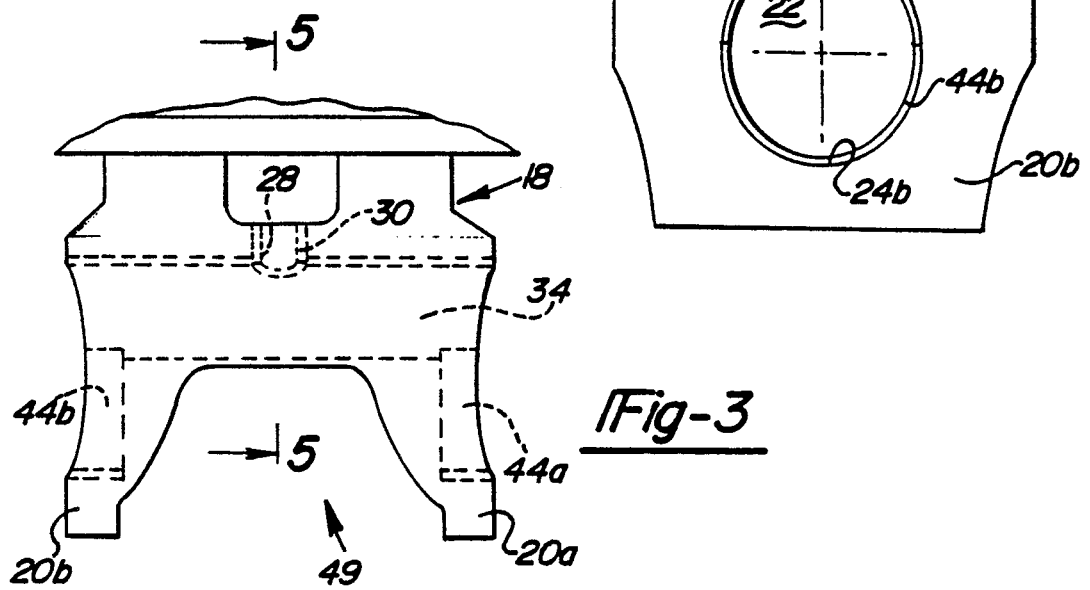
FIG. 3 is a partially broken-away front view of the piston of FIGS. 1 and 2.

Referring now to FIGS. 1-3 of the drawings, a crosshead piston 10 for use in a four stroke diesel engine (not shown) includes a head 12 having conventional compression and oil ring grooves 14, 16. Piston 10 includes a skirt 18 which depends from head 12 and is bifurcated into a pair of spaced skirt extensions 20a, 20b. A bore 22 having a center at "C" is formed in skirt 18 and extensions 20a, 20b for receiving a conventional pin for attaching the piston 10 to a conventional connecting rod (both not shown).

Bore 22 includes spaced bore segments 24a, 24b located in the spaced skirt extensions 20a, 20b which together define a discontinuous cylindrical piston bore wall 26. An oil supply port 28 is formed centrally in the upper surface of bore wall 26. An anti-rotation pin 30 is carried by port 28 and extends into bore 26, as will be later described.

Figure 4:
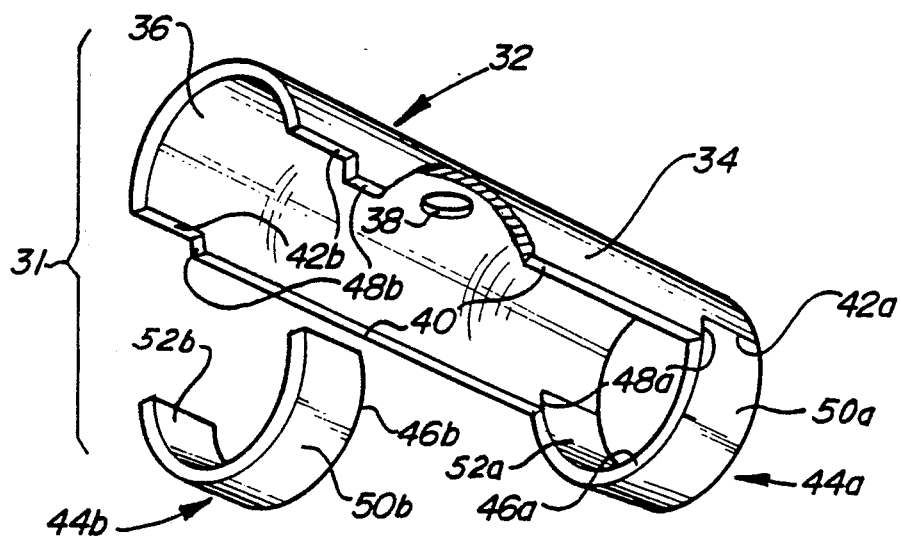
FIG. 4 is an exploded perspective view of the bearing shown in FIG. 1.
Figure 5:
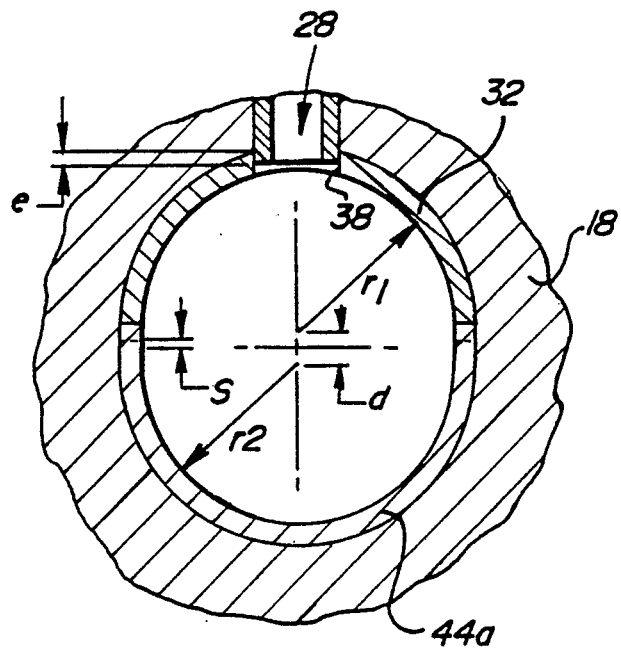
FIG. 5 is a partial sectional view, taken along the lines 5—5 of FIG. 3.

As best shown in FIGS. 3 and 4, a bearing 31, comprising upper and lower segments, is received within bore 22. The bearing includes an upper segment, or slipper 32 having a part-cylindrical outer surface 34 and a load bearing inner surface 36. Slipper 32 has an oil supply port 38 located centrally, which mates with the port 28 in the bore 22, as seen in FIG. 5. Thus, oil is supplied to the interior of bearing 31 to lubricate its interface with the connecting rod pin.

Slipper 32 has a pair of axially-extending lower edges 40 that extend between end notches 42a, 42b. The skirt extensions 20a, 20b receive lower bearing segments, or ears 44a, 44b that mate with notches 42a, 42b. Ears 44a, 44b have inner edges 46a, 46b that engage slipper notch shoulders 48a, 48b to prevent axially inward movement of ears 44a, 44b into contact with the connecting rod which operates in space 49 between ears 44a, 44b in skirt extensions 20a, 20b. Ears 44a, 44b have part-cylindrical outer surfaces 50a, 50b that engage the segments of bore wall 26 in skirt extensions 20a, 20b. The ears also have load bearing inner surfaces 52a, 52b.

As can be seen in FIGS. 3 and 5, the part-cylindrical outer surfaces 32, 50a, 50b form a continuous cylindrical outer surface engaging the cylindrical inner wall 26 of bore 22. As is readily apparent, the arcuate extent of slipper 32 is less than 180° of the arcuate extent of bore 22, while the arcuate extent of ears 44a, 44b is complementary thereto. This arrangement is necessary to facilitate easy removal and replacement of bearing 31 when worn, as will now be described.

In FIG. 5, pin 30 extends into bore 22 and into oil supply port 38 a distance "e" which is less than the thickness of slipper 32 to avoid contact with the connecting rod pin. Slipper lower edges 40 are shown spaced above the horizontal centerline by a distance "s" which must be at least half the distance "e" to enable slipper 32 to drop out of engagement with pin 30 for removal. Stated otherwise, distance "e" cannot be greater than twice the distance "s", or slipper 32 cannot be removed and replaced without deforming it or removing pin 30. With this arrangement, slipper 32 can be easily and economically removed and replaced.

As previously stated, the pin bore defined by the inner surfaces 36, 52a, 52b is elongated, as shown in FIG. 5. Slipper inner surface 36 includes about a 120° arc that is loaded during piston reciprocation. This arc is formed on a radius "$r_1$". Similarly, ear inner surfaces 52a, 52b include about a 120° arc formed on a radius "$r_2$". Both radii are vertically offset, or spaced from each other by a distance "d", thus creating an elongated pin bore. To prevent pinching of the pin, the sides of the inner surfaces beyond the loaded arcs are relieved.

Figure 6:
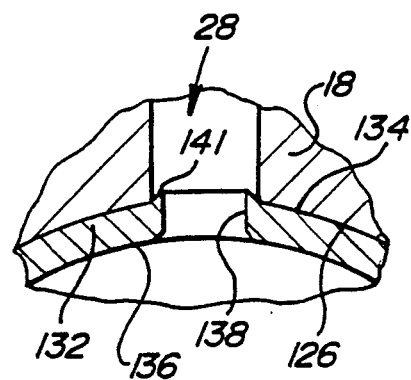
FIG. 6 is an enlarged view similar to a portion of FIG. 5, but illustrating another embodiment if this invention.

Another embodiment of this invention is illustrated in FIG. 6, in which like elements are indicated by like numerals increased by 100. Thus, slipper 132 has its outer surface 134 engaging bore wall 126. In this embodiment, the antirotation pin has been deleted. The antirotation function is served by a projection 141 extending from slipper outer surface 134 into the piston oil port 130. Projection 141 can be formed purposefully when oil port 138 is formed by staking or extruding a portion of the displaced bearing material outwardly. There are other obvious methods of providing projection 141. Again, the edges 140 of slipper 132 must be spaced above the piston bore horizontal centerline a distance at least half the height of projection 141 above slipper outer surface 134 to enable removal and replacement of the slipper.

The piston bearing according to this invention, as described above, provides a superior arrangement comprising a part-cylindrical upper bearing segment and a pair of spaced part-cylindrical lower bearing segments engageable with the upper segment to form a pair of spaced continuous circular bearing surfaces and having an anti-rotation projection on either the slipper or the piston bore, featuring an upper slipper segment having an arcuate extent of less than 180° to facilitate replacement of the slipper. A further feature is the axially-spaced notches formed in the ends of the slipper to engage the lower segments or ears to prevent the ears from moving inwardly into contact with the connecting rod.

What is claimed is:

1. A piston assembly comprising a piston having a cylindrical piston bore, a connecting rod, a pin received in the bore for connecting the piston to the rod, and a bearing interposed between the pin and the bore wall, the bearing including an upper segment and two axially-spaced lower segments, characterized by the upper bearing segment having an arcuate extent within the bore of less than 180° of the bore and the lower segments each having a complementary arcuate extent within the bore to provide a pair of axially-spaced continuous bearing surfaces.

2. A bearing received within a cylindrical piston bore in a piston assembly comprising a part-cylindrical upper segment and a pair of axially-spaced part-cylindrical lower segments, characterized by axially-spaced shoulders formed in the ends of the upper segment for receiving a portion of each of the lower segments to limit movement of the lower segments toward each other.

3. A bearing for mounting to a wall of a cylindrical piston bore in a piston assembly and comprising a part-cylindrical upper bearing segment and a pair of spaced part-cylindrical lower bearing segments, characterized by the upper segment and the bore wall having anti-rotation surfaces interengageable to prevent rotation of the upper segment within the bore and by the upper segment having axially-spaced shoulders engageable with portions of each of the lower segments to prevent movement of the lower segments toward each other.

4. The bearing of claim 3, further characterized by one of the surfaces being on a projection obstructing sliding axial insertion of the upper segment into the bore, the other surface being in a depression, and the upper segment having an arcuate extent of less than 180° of the bore to enable initial axial insertion of the upper segment into the bore which avoids engagement of the antirotation surfaces, and enable subsequent radial movement of the upper segment into engagement with the bore wall with the anti-rotation surfaces in engagement.

5. A bearing for mounting to a wall of a cylindrical piston bore in a piston assembly, comprising a part-cylindrical upper bearing segment and a pair of spaced part-cylindrical lower bearing segments engageable with the upper segment to form a pair of spaced continuous circular bearing surfaces, characterized by the upper segment having an arcuate extent of less than 180° of the bore.

6. The bearing of claim 5, further characterized by the upper segment having axially-spaced shoulders engageable with portions of the lower segments to prevent movement of the lower segments toward each other.

7. The bearing of claim 5, further characterized by the bore wall having a projection receivable within a depression formed in the upper segment to prevent rotation of the upper segment within the bore.

8. The bearing of claim 7, further characterized by the upper segment having axially-spaced shoulders engageable with portions of the lower segments to prevent movement of the lower segments toward each other.

9. The bearing of claim 5, further characterized by the upper segment having a projection receivable within a depression formed in the bore wall to prevent rotation of the upper segment in the bore.

10. A piston assembly comprising a piston having a cylindrical piston bore, a connecting rod, a pin received in the bore for connecting the piston to the rod, and a bearing interposed between the pin and the bore wall, the bearing including an upper segment and two spaced lower segments each having arcuate inner bearing surfaces so arranged that the center of the upper segment arc and the center of the lower segments' arc are vertically spaced to create a vertically elongated bearing bore, characterized by the upper bearing segment having an arcuate extent within the piston bore of less than 180° of the bore and the lower segments each having a complementary arcuate extent within the piston bore to provide a pair of axially-spaced continuous bearing surfaces.

11. The bearing of claim 10, further characterized by the upper segment having axially-spaced shoulders engageable with portions of each of the lower segments to prevent movement of the lower segments toward each other.

12. The bearing of claim 10, further characterized by the upper segment and the piston bore wall having anti-rotation surfaces interengageable to prevent rotation of the upper segment within the piston bore.

13. The bearing of claim 12, further characterized by one of the anti-rotation surfaces being on a projection obstructing sliding axial insertion of the upper segment into the piston bore, the other surface being in a depression, and the upper segment having an arcuate extent of less than 180° to enable initial axial insertion of the upper segment into the piston bore which avoids engagement of the antirotation surfaces, and to enable subsequent radial movement of the upper segment into engagement with the piston bore wall with the anti-rotation surfaces in engagement.

14. The bearing of claim 10, further characterized by the piston bore wall having a projection receivable within a depression formed in the upper segment to prevent rotation of the upper segment within the piston bore.

15. The bearing of claim 14, further characterized by the upper segment having axially-spaced shoulders engageable with portions of the lower segments to prevent movement of the lower segments toward each other.

16. The bearing of claim 10, further characterized by the upper segment having a projection receivable within a depression formed in the piston bore wall to prevent rotation of the upper segment in the piston bore.

* * * * *